United States Patent [19]

Dunn et al.

[11] 4,447,251
[45] May 8, 1984

[54] SONIC LEVITATION APPARATUS

[75] Inventors: Stanley A. Dunn; Alan R. Pomplun; Elmer G. Paquette, all of Madison, Wis.; Edwin C. Ethridge; Jerry. L. Johnson, both of Huntsville, Ala.

[73] Assignee: The United States of America as represented by the Administrator of the National Aeronautics and Space Administration, Washington, D.C.

[21] Appl. No.: 493,866

[22] Filed: May 12, 1983

[51] Int. Cl.$^3$ .......................................... C03D 19/10
[52] U.S. Cl. ....................................... 65/142; 65/21.3; 65/21.4; 65/160; 137/838; 366/106; 425/6
[58] Field of Search ................ 366/106, 127; 137/838; 65/21.3, 21.4, 142, 160; 425/6

[56] References Cited

U.S. PATENT DOCUMENTS 2,911,669 11/1959 Beckwith .......................... 65/21.3 X
4,313,745 2/1982 Kendall ................................ 65/21.4
4,400,191 8/1983 Miller et al. ......................... 65/21.4

OTHER PUBLICATIONS

NASA Tech. Briefs, vol. 5, #2, Summer 1980, p. 236, Controlling the Shape of Microballoons.

*Primary Examiner*—Robert L. Lindsay, Jr.
*Attorney, Agent, or Firm*—Leon D. Wofford, Jr.; John R. Manning; Joseph H. Beumer

[57] ABSTRACT

A sonic levitation apparatus (A) is disclosed which includes a sonic transducer (14) which generates acoustical energy responsive to the level of an electrical amplifier (16). A duct (B) communicates with an acoustical chamber (18) to deliver an oscillatory motion of air to a plenum section (C) which contains a collimated hole structure (D) having a plurality of parallel orifices (10). The collimated hole structure converts the motion of the air to a pulsed, unidirectional stream providing enough force to levitate a material specimen (S).

20 Claims, 3 Drawing Figures

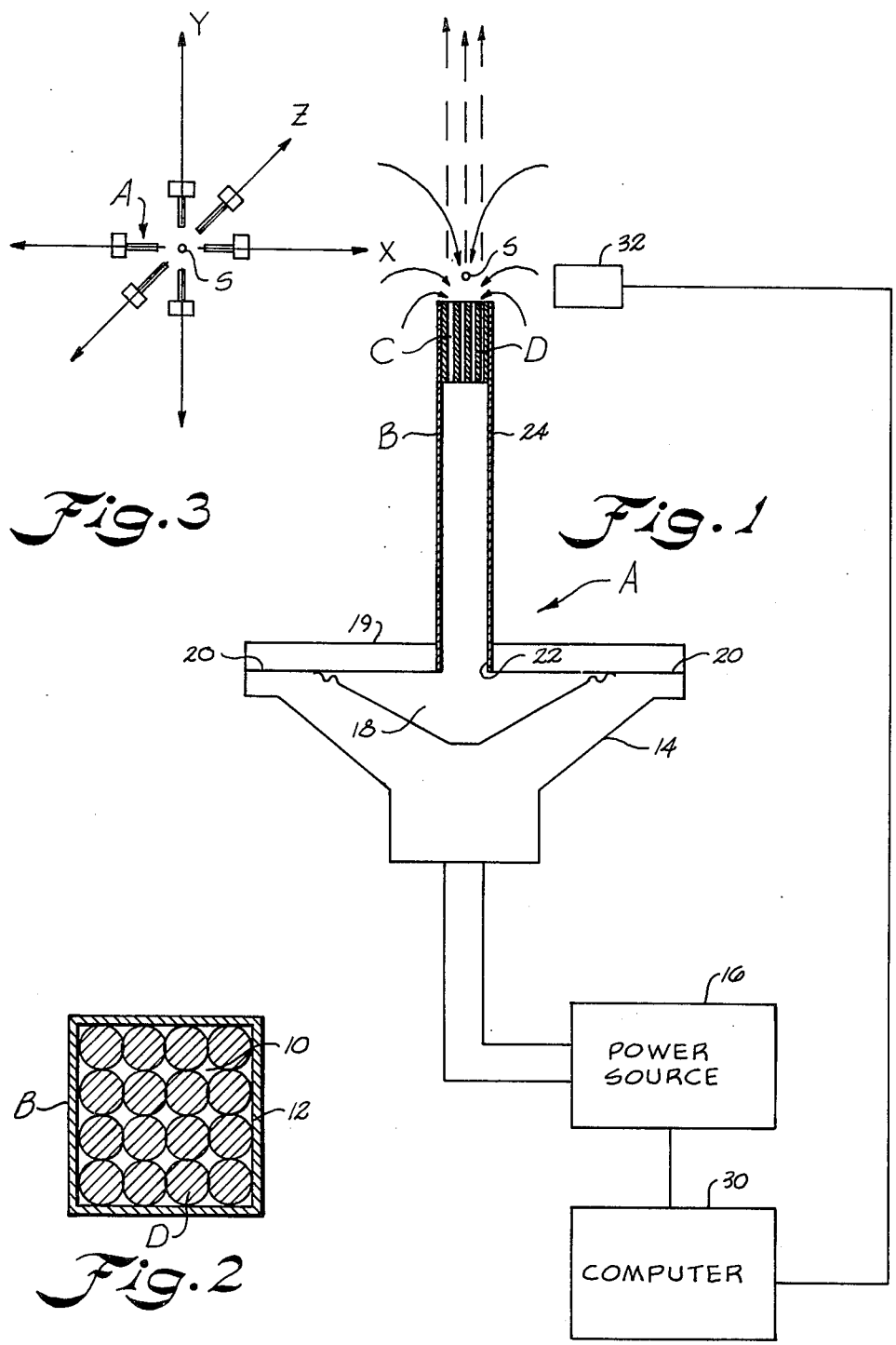

SONIC LEVITATION APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The invention relates to a levitation microfurnace apparatus for processing and shaping small bodies where contact with foreign objects or supports could be deleterious. In particular, the invention has application to the processing of minute glass microballoons or microspheres. The microballoon is a thin wall glass structure such as used in the processing fuel in laser fusion. The microballoon is filled with heavy hydrogen cryogenically condensed as a thin layer on the interior of the walls. It is then bombarded with energy focused from a laser. The glass material then vaporizes and the hydrogen contained therein is driven to the center by inertial reaction and compressed to a very dense and very hot plasma material resulting in fusion of the hydrogen.

Glass microballoons (GMBs) which are used to contain the fuel must be precisely spherical and have uniform wall thickness. Those obtainable commercially are only rarely of the required degree of perfection. Sorting them out from the accompanying imperfect GMBs is a major task.

It is thought that the imperfect GMBs might be brought to any degree of geometric perfection by remelting, reprocessing and recooling, all the time maintaining them in a levitated state, out of contact with solid or liquid objects. Alternatively, this containerless type of processing might be applied to the initial formation of GMBs from porous glass frit or other suitable precursor materials, as well as to their reprocessing.

Accordingly, apparatus for levitating the microballoons in a microfurnace so that their formation may be accurately controlled to provide a more perfectly and uniformly formed balloon is a problem to which considerable attention need be given.

In order to form GMBs of large diameters such as up to one centimeter, it is necessary to process them in a low or zero gravity condition such as in space. While apparatus is well known for levitating a specimen of material in a gravitational field by opposed field gradients of electromagnetic, acoustic or gas inertial origin, these apparatus are not entirely suitable for levitating a microsphere in a low gravity environment, where accelerations are typically variable, not only with respect to magnitude but direction as well. When positioning and levitation of a GMB in an orthogonal triaxial coordinate system is necessary such as in processing the GMB in space, the problem of rapid and accurate control of restoring forces to neutralize unwanted extraneous accelerations becomes particularly acute.

One well known method of levitation involves a collimated flow of a number of equispaced equivelocity streams of gas or liquid impinging upon a GMB or other small body in such a way as to counter and neutralize the net force vector tending to displace the body from a preferred position. The device whence these streams issue is commonly called a collimated hole structure (CHS). The depth of the CHS holes in relation to their diameter, their aspect ratio, influences the persistence of the collimation and other levitating properties of the issuing streams. The higher the aspect ratio the greater the persistence.

Due to the fact that the holes have been formed heretofore by drilling, they have been of limited aspect ratio as well as being circular.

A need also exists for apparatus for preparing solid particles of materials such as novel glasses under conditions enabling a quick quench and avoiding contact with a container.

SUMMARY OF THE INVENTION

Accordingly, an important object of the present invention is to provide apparatus for levitating a GMB or other small object which is simple yet reliable and sufficiently precise for levitating and processing a GMB in a low gravity environment.

Another important object of the present invention is to provide a simple method of fabricating high aspect ratio collimated hole structures (CHS) for producing levitating flows of parallel, equispaced, equivelocity streams of gas or liquids.

Another important object of the present invention is to provide without the use of valves or other moving parts, a simple means of converting sonic energy into pulsed unidirectional flows of gases or other fluids which may be suitable for levitation of GMBs or other small bodies.

Yet another important object of the present invention is to provide a sonic powered levitation device wherein levitation is achieved by aerodynamic lift imparted to a small body specimen from a pulsating gaseous flow produced by passage of sonic energy through the gas within a CHS, which eliminates the need for moving valve parts.

Still another important object of the present invention is to provide a sonic levitator which may be used along the axes of an orthogonal triaxial coordinate system to levitate a body of material in a variable low gravity environment.

It has been found according to the present invention, that the sonic output of a sound generator ducted into a collimated hole structure will provide, above the free end, sufficient net air flow in one direction to levitate a GMB or other small body. The CHS, comprising an array of parallel passages, is carried adjacent to the end of a tubular duct which is connected to a chamber of the sonic energy generator. The sonic energy generator is driven by a sinusoidal or other periodic pressure source. The CHS behaves as a rectifier of the oscillatory sound energy, converting it into a pulsating gas flow in one direction only which is useful in levitation. Between the sound generator and the free or upper surface of the CHS the gas undergoes no net movement, only the oscillatory motion typical of sound transmission. Above the free surface of the CHS, the outward and inward swings of each sound vibration become differentiated with respect to direction. The inward swings are characterized as omnidirectional, moving toward the CHS openings more or less symmetrically from all available direction of the $2\pi$ steradians above the CHS surface. The outward swings, by contrast, are unidirectional and aligned with the CHS passages. The oscillatory sonic character of the gas at the CHS surface gradually gives way to pulsed unidirectional flow with height, the transition being virtually complete at an elevation about a plenum diameter above the CHS surface. The transition is due to the fact that the outward swings being aligned and of constant cross-section are of constant flux density with height above the CHS while the flux density of the inward swings attenuate with the expanding cross-section characteristic of their radial flow pattern. In essence, during each sound vibration the sonic pump brings in air or other fluid from all directions surrounding the mouth of the CHS and ejects it in one direction only.

It has also been found according to the present invention that the cross-section of the holes in a CHS need not be circular and, consequently, that CHSs of any aspect ratio desired may be made consisting of the interstices in a tight, regular bundle of equal length uniform diameter wires. The bundling may be either a hexagonal close packed or a rectilinear array.

The sonic generator may be driven by any conventional amplifier. Levitation is initiated by simply raising the power of the amplifier with the GMB or microsphere resting on the surface of the collimated hole structure. As the power is increased, the microsphere first hops around in response to the oscillatory flow character at the surface. Eventually, it will hop high enough to attain a level where the unidirectional flow is dominant whereupon it will become stably levitated.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a schematic view illustrating a sonic pump levitator constructed according to the present invention;

FIG. 2 is an enlarged top plan view of the collimated hole structure for levitating a microsphere as illustrated in FIG. 1; and FIG. 3 is a schematic view of the axial arrangement of six acoustical levitator devices constructed in accordance with the present invention as arranged along the axes of a triaxial orthogonal coordinate system for levitating a microsphere in a stable levitating position under low gravity conditions.

DESCRIPTION OF A PREFERRED EMBODIMENT

The drawing illustrates a sonic pump levitation apparatus for levitating a microsphere which includes a sonic generator, designated generally as A, having an acoustical chamber in which a sound energy transporting fluid is contained. A closure means seals the chamber from the outside environment and includes a medial opening which communicates with a tubular duct means B which terminates in a free end. Means for driving the sound generator and producing a periodic pressure source is provided by an electrical power source. A plenum means C is carried adjacent the free end of the tubular duct and includes an interstitial collimated hole structure D within plenum C by means of which sonic energy impressed upon the air or fluid within said structure D is converted at and above the free end into a unidirectional pulsed stream of air suitable for levitation. The inward stroke of each sound cycle draws air or fluid into the mouth of said structure D from all angles of bearing and azimuth. This ingested air or fluid when expelled during the outward stroke, however, is carried by its momentum in alignment with the axis of said structure D and does not laterally disperse, thus creating a unidirectional pulsating jet suitable for levitation.

As illustrated, the collimated structure D includes a plurality of parallel passages 10 formed in a plenum 12 which is carried adjacent the free end of the duct means B. As can best be seen in FIG. 2, the collimated passages are comprised of the interstices between and among a four by four matrix of uniform diameter rods snugly fitted within the plenum in rectilinear array. There are nine full size interstitial passages of quatrefoil cross-section located centrally. At the boundaries with the plenum there are twelve half size and four quarter size further passages all with trefoil cross-sections. The trefoils contribute little to the levitating flow because of their smaller effective diameters. Circular cross-section collimated passages are well known and may also be used, of course.

Sound generator A may include a conventional sonic transducer device 14 which may be any suitable audio loudspeaker for converting electrical energy into sound energy. A power source is illustrated at 16 for driving the sonic transducer 14 which may be any suitable electrical amplifier. By varying the level of the amplifier 16, the electrical energy driving the loudspeaker 14 may be varied to vary the sonic energy and the flow momentum of the pulsed levitational stream as required.

The loudspeaker device 14 includes an acoustical chamber 18 in which a sound energy transporting medium or fluid such as air is contained.

Closure means for sealing the acoustical chamber includes a flat plate 19 sealed to the loudspeaker at its edges 20 and perforated at 22 to provide communicating into the acoustical chamber 18.

The cross-section of said member 24 is square as a matter of convenience although it could be circular, hexagonal or other compact closed shape offering minimal resistance to flow. The upper or free end of member 24 serves as the plenum housing the interstitial collimated hole structure, its square cross-section nicely accommodating the rectilinear array of interstitial forming rods. Any slack between the rod matrix and the interior of the plenum is taken up by appropriately sized shim stock (not shown in FIG. 2) to achieve a snug fit. Alternatively, instead of tubing, the plenum may be formed between mating blocks, a rectangular groove being machined in one of them to just accommodate the rods and provide a snug fit when the blocks are bolted together. The matrix may also be made up of a bundle or wires of fibers.

Sound generation by the loudspeaker 14 results in a corresponding sinuously reversing flow in the duct means B. At the mouth of the collimated hole structure D are two entirely different flow patterns for the fluxes in and out of the orifices 10 of the collimated hole structure. The influx pattern is nearly isotropic and the efflux, although pulsating, is in one direction only and in other respects similar to the desired collimated flow resulting from a constant pressure supply of gas through the collimated hole structure.

The dichotomous flow pattern stems from the fact that the influx is dictated by pressure gradient and the efflux by momentum of the gas. The collimated hole structure orifices behave as a gas sink during the influx. Since no momentum bias is involved, a more or less isotropic system of isobars and pressure gradients develops, directing the flow accordingly. Inherent in the efflux, however, is the momentum engendered in the air during its flow through the collimated hole structure D. These momentum vectors are not soon dissipated and they dominate for some distance above the collimated hole structure, thereby maintaining alignment of the flow with the collimated hole structure axis, and precluding radial diversion analogous to the radial converging pattern of the influx.

The inertia of the loudspeaker cone is such that the response times are easily obtainable with an off-the-shelf loudspeaker item of modest cost and high reliability. Furthermore, the output of the air stream is a monotonic and sensitive function of the incoming electrical energy or signal to the loudspeaker.

While the sonic pump levitation apparatus resembles some fluidic devices in its switching of gas flow patterns, this is accomplished without any reliance upon conventional valving mechanism or vanes or, indeed any moving part except the vibrating loudspeaker cone itself. The apparatus provides a simple and unique means for converting an alternating gas flow into a pulsating direct current flow, to use the electrical idiom. This pulsating DC flow is capable of levitating suitably sized bodies such as glass microballoons and solid microspheres.

The intensity of the acoustical generator, and hence the height of levitation is easily and rapidly controlled by adjustment of the electrical power to the loudspeaker. Response time is of the order of the reciprocal of the upper frequency limit of the speaker. The glass microballoons are of the order of a millimeter in diameter. Under these conditions, power levels of about a quarter of a watt produce stable levitation. Except in the region immediately above the collimated hole structure plenum, stability is comparable to that obtained with the steady flow of levitation gas. This region of instability, which extends for about a diameter of the plenum above the surface of the collimated hole structure, coincides with the cross-over of the influx and efflux flow patterns.

The high aspect ratio of the passages of the collimated hole structure and the relatively long distance between the collimated hole structure plenum to the loudspeaker thermally isolate the levitation flow from all elements of the apparatus in back of the plenum. Thermally sensitive components such as the loudspeaker thus may be safely incorporated with high temperature levitating conditions.

EXAMPLE

In one embodiment, a four-inch ten watt loudspeaker was utilized to generate enough air flow in one direction to levitate a solid six hundred micron glass microsphere. The face of the speaker was covered with a flat steel plate ⅛ of an inch thick and a duct B was made utilizing a ¼ inch square tubing approximately 2.75 inches long. The collimated hole structure D was contained in a plenum means 12 and was comprised of interstices 10 in a square array of 16 equal lengths, equal diameter rods held in place by the clamping action of suitably sized shims (not shown) inserted along the adjacent sides of plenum means 12. The length of the interstitial passages is 0.5 inches. The rod diameter was 0.025 inches, hence the passage diameter varied from a maximum of 0.025 to a minimum of 0.010 inches. The aspect ratio of the passages is defined as the ratio of their length to diameter, and is preferably in the range of 5:1 to 50:1.

Levitation was initiated by resting the glass microsphere on the surface of the collimated hole structure and raising the level of the power transmitted by amplifier 16. As the power was increased, the glass microsphere first bobbed around the surface of the collimated hole structure and then leaped up to around a millimeter from the surface and locked into a stable levitation position. Once levitated, the glass microsphere could be raised and lowered over a range of several millimeters by adjusting the power fed to the loudspeaker 14. Levitation was accomplished utilizing the four inch ten watt loudspeaker operated in a range of approximately 750 hertz.

As illustrated in FIG. 3, six sonic levitation apparatus A are illustrated with the members of each of three pairs being arranged in opposition along an axis of a triaxial orthogonal coordinate system. In this manner, the microsphere or microballoon S may be levitated in a stable position when undergoing processing in low gravity environments such as in space. In this case, a conventional computer or microprocessor 30 may be utilized in conjunction with a conventional video scanner 32 of the specimen S to maintain the positioning of the microsphere or microballoon through feedback control of the energy level of amplifier 16 and loudspeaker 14 of each sonic pump device.

Deviations in the levitation position of the microsphere S can be detected by the video scanner and input to the computer. The computer then generates an electrical signal from the feedback loop which corrects the levitational position by increasing or decreasing the power fed to a loudspeaker and thus correcting the gas pulses from the levitational apparatus as required. Since the gas pulse must have very rapid up and down times, on the order of a milisecond, apparatus of the present invention is particularly advantageous since there are no moving parts. Valve systems have very high inertia and not very rapid response times. In accordance with the present invention, the apparatus disclosed herein has very rapid response times and is very readily usable in such an automatic system.

While a preferred embodiment of the invention has been described using specific terms, such description is for illustrative purposes only, and it is to be understood that changes and variations may be made without departing from the spirit or scope of the following claims.

What is claimed is:

1. Apparatus for levitating a material specimen comprising:
    a duct having an interior adapted to be filled with gas;
    a collimated passage means disposed within and at an end of said duct, said collimated passage means including an array of parallel passageways communicating with the interior of said duct with the surrounding atmosphere; and
    a sound generator means for imparting oscillatory motion to the gas within said duct so as to provide levitating force in the form of pulsed, unidirectional motion of gas axially beyond the end of said collimated passage means.

2. The apparatus of claim 1 including an acoustical chamber in communication with the interior of said duct.

3. The apparatus of claim 2 wherein said duct is disposed vertically.

4. The apparatus of claim 3 wherein said acoustical chamber is joined to the lower end of said duct and sealed from the outside environment.

5. The apparatus of claim 4 wherein said sound generator means includes a device for converting electrical energy into acoustical energy.

6. The apparatus of claim 5 including a variable power source of electrical energy connected to said sound generator means for controllably varying said acoustical energy and the levitational forces produced thereby.

7. The apparatus of claim 6 including a plurality of solid rod, wires or fibers of circular cross-section disposed vertically in a bundle within a plenum region forming the upper end of said duct, the open spaces between the said rods, wires or fibers providing an array of parallel passageways.

8. The apparatus of claim 6 wherein said duct is a tube of generally rectangular cross-section.

9. The apparatus of claim 8 wherein the ratio of length to diameter of said rods is in the range of 5:1 to 50:1.

10. The apparatus of claim 9 wherein the length of said rods is about 0.5 inch and their diameter 0.025 inch.

11. The apparatus of claim 6 wherein said acoustical chamber is contained in an upwardly extending, conical-shaped speaker having its upper periphery sealed to a flat plate.

12. The apparatus of claim 11 wherein said plate is penetrated by a central passageway axially above the center of said speaker, the said plate being sealed to the lower end of said duct around the periphery of said plate passageway.

13. An apparatus for providing a pulsed, unidirectional gas flow comprising:
  a tubular duct adapted to be filled with gas;
  a collimated passageway structure disposed within and at an end of said duct, said structure having an array of parallel passageways communicating the interior of said duct with the surrounding environment;
  a sound generator means for imparting oscillatory motion to the gas within said duct, thereby providing a pattern of pulsed, unidirectional gas flow at a zone located beyond the outer end of said passageway structure.

14. The apparatus of claim 13 wherein said sound generator means comprises a conical speaker disposed in axial alignment with said duct.

15. The apparatus of claim 14 including a flat plate sealed to the extended end of said speaker and penetrated by a passageway communicating the acoustical chamber contained therein with the inerior of said duct.

16. The apparatus of claim 15 wherein said collimated passageway structure comprises a plurality of rods of circular cross-section and uniform diameter disposed in axial alignment so as to provide axially extending open spaces therebetween.

17. Apparatus for levitating a material specimen in a low or variable-gravity environment comprising:
  a plurality of tubular ducts arranged in opposed pairs in a triaxial orthogonal coordinate system, each of said ducts having an interior adapted to be filled with gas and containing at one end a collimated passage means including an array of parallel passageways communicating with the interior of the duct with the surrounding atmosphere and at its other end a sound generator means for imparting oscillatory motion to the gas within the duct so as to provide levitating force in the form of pulsed unidirectional motion of gas axially beyond said collimated passage means; and
  means for variably supplying energy to said sound generator means.

18. The apparatus of claim 17 including means for sensing the position of a specimen levitated therein and controllably adjusting the energy supplied to said sound generator means so as to maintain said specimen at a predetermined location.

19. The apparatus of claim 18 wherein said sound generator means is a loudspeaker.

20. The apparatus of claim 19 wherein said sensing means is a video scanner.

* * * * *